(12) United States Patent
He et al.

(10) Patent No.: US 10,693,268 B2
(45) Date of Patent: Jun. 23, 2020

(54) CONDUCTIVE SLIP RING FOR LOGGING WHILE DRILLING INSTRUMENT

(71) Applicant: Institute of Geology and Geophysics, Chinese Academy of Sciences, Beijing (CN)

(72) Inventors: Xinzhen He, Beijing (CN); Qingyun Di, Beijing (CN); Wenxuan Chen, Beijing (CN); Jiansheng Du, Beijing (CN); Qingbo Liu, Beijing (CN)

(73) Assignee: INSTITUTE OF GEOLOGY AND GEOPHYSICS CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/556,164

(22) Filed: Aug. 29, 2019

(65) Prior Publication Data
US 2020/0067247 A1    Feb. 27, 2020

Related U.S. Application Data

(63) Continuation of application No. PCT/CN2018/123968, filed on Dec. 26, 2018.

(30) Foreign Application Priority Data

Aug. 24, 2018    (CN) .......................... 2018 1 0975401

(51) Int. Cl.
*H02K 7/08* (2006.01)
*H01R 39/08* (2006.01)
(Continued)

(52) U.S. Cl.
CPC ............. *H01R 39/08* (2013.01); *E21B 41/00* (2013.01); *H01R 39/20* (2013.01); *H01R 39/26* (2013.01);
(Continued)

(58) Field of Classification Search
CPC ........ H01R 39/08; H01R 39/20; H01R 39/26; H01R 39/34; H01R 39/643; H02K 7/088;
(Continued)

(56) References Cited

U.S. PATENT DOCUMENTS

| 3,690,166 A | * | 9/1972 | Fitzhugh | ................. E21B 7/124 73/84 |
| 2011/0017473 A1 | * | 1/2011 | Clarkson | ................. E21B 7/062 166/380 |

(Continued)

FOREIGN PATENT DOCUMENTS

| CN | 2872677 | 2/2007 |
| CN | 202150614 | 2/2012 |

(Continued)

OTHER PUBLICATIONS

Search Report of PCT/CN2018/123968.
Written Opinion of PCT/CN2018/123968.

*Primary Examiner* — Naishadh N Desai
(74) *Attorney, Agent, or Firm* — Dragon Sun Law Firm, PC; Jinggao Li, Esq.

(57) ABSTRACT

The present disclosure relates to a conductive slip ring for logging while drilling (LWD) instrument. The present disclosure utilizes a mechanical conductive slip ring to solve the problems of transmission of electric power and signals between two structures that have relative rotation, and the conductive slip ring has a simple structure, doesn't involve any complex circuit, and has low cost and high reliability. With the conductive slip ring in the present disclosure, there is no power transmission efficiency problem or signal transmission error rate problem. The conductive slip ring has high temperature-resistant, pressure-proof, and vibration-roof abilities, and can be applied widely.

10 Claims, 2 Drawing Sheets

(51) Int. Cl.
*E21B 41/00* (2006.01)
*H01R 39/20* (2006.01)
*H01R 39/26* (2006.01)
*H02K 13/00* (2006.01)
*H01R 39/34* (2006.01)
*H01R 39/64* (2006.01)
*E21B 49/00* (2006.01)

(52) U.S. Cl.
CPC ............. *H01R 39/34* (2013.01); *H02K 7/088* (2013.01); *H02K 13/003* (2013.01); *E21B 49/00* (2013.01); *H01R 39/643* (2013.01)

(58) Field of Classification Search
CPC .......... H02K 13/003; G01V 1/44; G01V 1/52; G01V 2200/16; G01V 2001/526; E21B 47/14
See application file for complete search history.

(56) References Cited

U.S. PATENT DOCUMENTS

| | | | |
|---|---|---|---|
| 2015/0229087 A1* | 8/2015 | Sihler | H01R 39/643 166/65.1 |
| 2016/0168913 A1* | 6/2016 | Hay | E21B 4/04 175/57 |
| 2019/0119551 A1* | 4/2019 | Price Hoelscher | C09K 8/032 |

FOREIGN PATENT DOCUMENTS

| | | |
|---|---|---|
| CN | 102509943 | 6/2012 |
| CN | 202333397 | 7/2012 |
| CN | 103321584 | 9/2013 |
| CN | 106133857 | 11/2016 |
| CN | 106194048 | 12/2016 |
| CN | 107834333 | 3/2018 |
| CN | 109326938 | 2/2019 |

* cited by examiner

C-C

D

CONDUCTIVE SLIP RING FOR LOGGING WHILE DRILLING INSTRUMENT

CROSS-REFERENCE TO RELATED PATENT APPLICATION

This application is a bypass continuation application of PCT Application No. PCT/CN2018/123968. This Application claims priority from PCT Application No. PCT/CN2018/123968, filed Dec. 26, 2018, and Chinese Patent Application No. 201810975401.7, filed Aug. 24, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The invention relates to the technical field of precision electrical connections, and in particular relates to a conductive slip ring for logging while drilling (LWD) instrument.

BACKGROUND OF THE DISCLOSURE

When a logging while drilling (LWD) instrument is used in underground work, the working environment is very harsh, and involves high temperature, high pressure, strong vibration, and strong impact; in addition, the LWD instrument has to work in a mud environment. In such a case, the transmission of electric power and signals becomes a big problem. Especially, the transmission of electric power and signals becomes extremely unreliable between two structures with relative rotation, and has to be implemented by means of wireless communication techniques or wireless power transmission techniques utilizing electromagnetic waves. However, wireless communication techniques utilizing electromagnetic waves can only solve the communication problem between instruments, but can't solve the problem of electric power transmission; in addition, the circuit is complex, the cost is high, and the circuit temperature is high, resulting high difficulties.

Wireless electric power transmission techniques have high failure rates in a complex downhole environment, and the efficiency of electric power transmission is limited in a mud environment, an error rate problem exists in signal transmission, the circuit is complex, the cost is high, and the circuit temperature is high, resulting high difficulties.

Therefore, a heretofore unaddressed need exists in the art to address the aforementioned deficiencies and inadequacies.

SUMMARY OF THE DISCLOSURE

In order to solve the above problems, the object of the present disclosure is to provide a conductive slip ring for logging while drilling (LWD) instrument, which can solve the problems of electric power and signal transmission between two structures with relative rotation in the LWD instrument, such as between the stator and the rotor of the generator, in the rotary steering tool structure, and between the stator and the rotor of the screw drilling tool, etc., and has a simple structure, doesn't involve any complex circuit, has low cost, high reliability, and strong temperature, pressure, and vibration resistance abilities.

Technical scheme: a conductive slip ring for logging while drilling (LWD) instrument, comprising a housing of slip ring device, a top connector of slip ring, a bottom connector of slip ring, an output shaft of slip ring, an end cap of slip ring, a support body, an inner core system of slip ring, and an electric power and signal transmission device;

wherein, the housing of slip ring device, the top connector of slip ring, the bottom connector of slip ring, the output shaft of slip ring, and the end cap of slip ring form a sealed cavity together, with high temperature-resistant lubricant fully filled in the sealed cavity, the top connector of slip ring is used as an electric power and signal input end or output end, the output shaft of slip ring is used as an electric power and signal input end or output end;

the electric power and signal transmission device is configured to transfer received electric power and signals to the inner core system of slip ring or transmit the electric power and signals emitted by the inner core system of slip ring;

the inner core system of slip ring is configured to transfer the received electric power and signals to the electric power and signal transmission device or transmit the electric power and signals emitted by the electric power and signal transmission device.

Furthermore, the support body is fixedly connected to a drill collar via a pin, a mud flow channel is arranged at the inner side of the support body, the housing of slip ring device is fixed inside the support body by screws, and the two ends of the housing of slip ring device extend out of the support body, the top connector of slip ring is arranged at one end of the housing of slip ring device, the bottom connector of slip ring is arranged at the other end of the housing of slip ring device, the end cap of slip ring is arranged at the other end of the bottom connector of slip ring, the electric power and signal transmission device is arranged inside the top connector of slip ring and extends into a cavity of slip ring inside the housing of slip ring device and is connected with one end of the inner core system of slip ring;

an output shaft support bearing is arranged inside the bottom connector of slip ring, an inner race of the output shaft support bearing is locked by means of a lock nut, a wavy spring is arranged at a joint between the housing of slip ring device and the bottom connector of slip ring, an outer race of the output shaft support bearing is pre-tensioned by compressing the wavy spring, one end of the output shaft of slip ring passes through the bottom connector of slip ring and is mounted on the output shaft support bearing, and is fixedly connected with one end of the inner core system of slip ring, and the other end of the output shaft of slip ring is connected with a relative rotation structure of the LWD instrument;

the housing of slip ring device is provided with a lubricant filler that communicates with the cavity of slip ring and is provided with a lubricant plug.

Furthermore, the inner core system of slip ring comprises a rotor of slip ring, a stator of slip ring, a sheath, and a rotor support bearing;

wherein, the rotor support bearing is fixedly arranged inside the sheath, the stator of slip ring is mounted on the rotor support bearing, the rotor of slip ring is arranged inside the stator of slip ring, and one end of the rotor of slip ring is connected via a pin with the output shaft of slip ring; stator brushes are embedded inside the stator of slip ring, gold-plated copper rings are embedded in the surface of the rotor of slip ring, and the stator brushes always contact with the gold-plated copper rings.

Furthermore, a stop screw is arranged on the sheath, and the stop screw is connected with the stator of slip ring; when the stop screw is embedded in a stop key slot in an inner side wall of the cavity of slip ring, the sheath 15 and the stator of slip ring are fixed and can't rotate with respect to the housing of slip ring device.

Furthermore, the electric power and signal transmission device comprises a high pressure electrical feedthru connector pin, a high pressure electrical feedthru connector boot, and transition sheaths;

one end of the high pressure electrical feedthru connector pin is inserted in the high pressure electrical feedthru connector boot, and the transition sheaths are arranged at the two ends of the high pressure electrical feedthru connector pin and the high pressure electrical feedthru connector boot.

Furthermore, the sheath is made of a high temperature-resistant non-metal material, including PEEK or nylon.

Benefits: with the above technical scheme, the present disclosure utilizes a mechanical conductive slip ring to solve the problems of transmission of electric power and signals between two structures that have relative rotation in the LWD instrument, and the conductive slip ring has a simple structure, doesn't involve any complex circuit, and has low cost and high reliability. With the conductive slip ring in the present disclosure, there is no power transmission efficiency problem or signal transmission error rate problem. The conductive slip ring has high temperature-resistant, pressure-proof, and vibration-roof abilities, and can be applied widely.

BRIEF DESCRIPTION OF DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

In the figures.

1—housing of slip ring device; 1.1—balance piston travel cylinder; 1.2-first O-ring; 1.3—stop key slot; 1.4—pressure balance hole; 2—top connector of slip ring; 2.1—second O-ring; 3—bottom connector of slip ring; 4—output shaft of slip ring; 5—end cap of slip ring; 6—filter screen; 7—support body; 7.1—mud flow channel; 8—high pressure electrical feedthru connector pin; 9—high pressure electrical feedthru connector boot; 10—transition sheath; 11—pressure balance piston; 12—lubricant plug; 13—rotor of slip ring; 14—stator of slip ring; 14.1—stator brush; 15—sheath; 15.1—stop screw; 16—rotor support bearing; 17—output shaft support bearing; 18—wavy spring; 19—lock nut; 20—dynamic seal ring; 21—wire; 22—pin.

DETAILED DESCRIPTION OF THE DISCLOSURE

Hereunder the technical scheme of the present disclosure will be further detailed with reference to the accompanying drawings.

Figure 1:
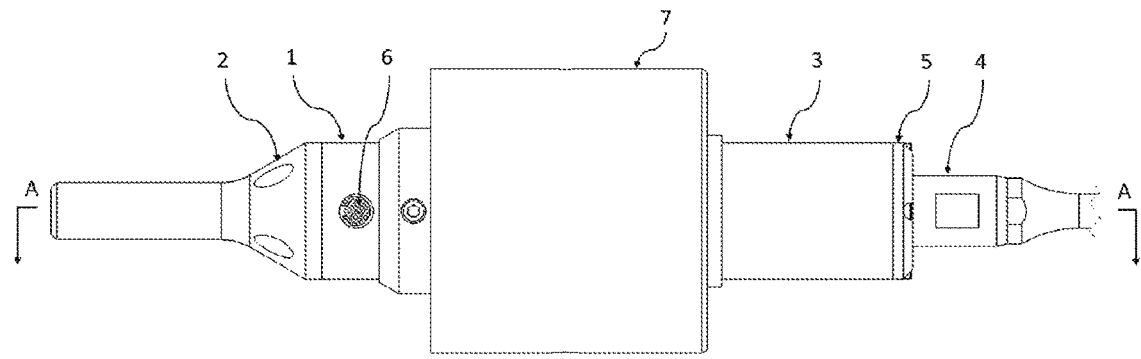
FIG. 1 is a schematic diagram of the external structure of the conductive slip ring for logging while drilling (LWD) instrument in the present disclosure.
Figure 2:
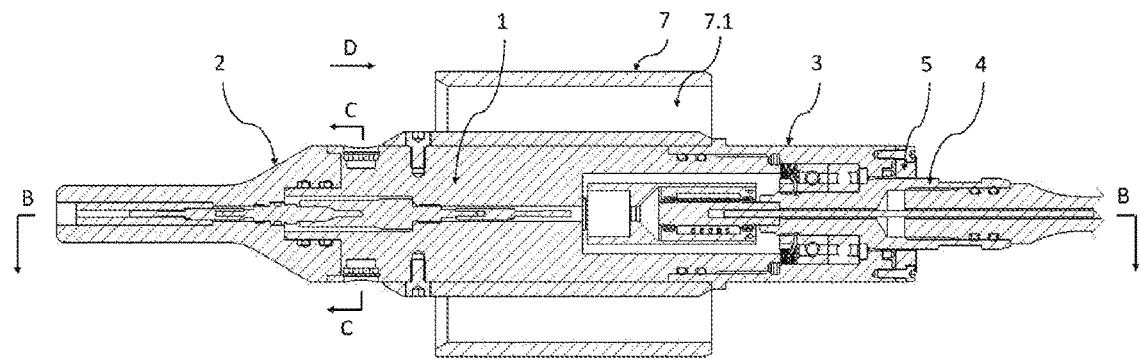
FIG. 2 is a schematic diagram of the internal structure of the conductive slip ring for LWD instrument according to the present disclosure.
Figure 3:
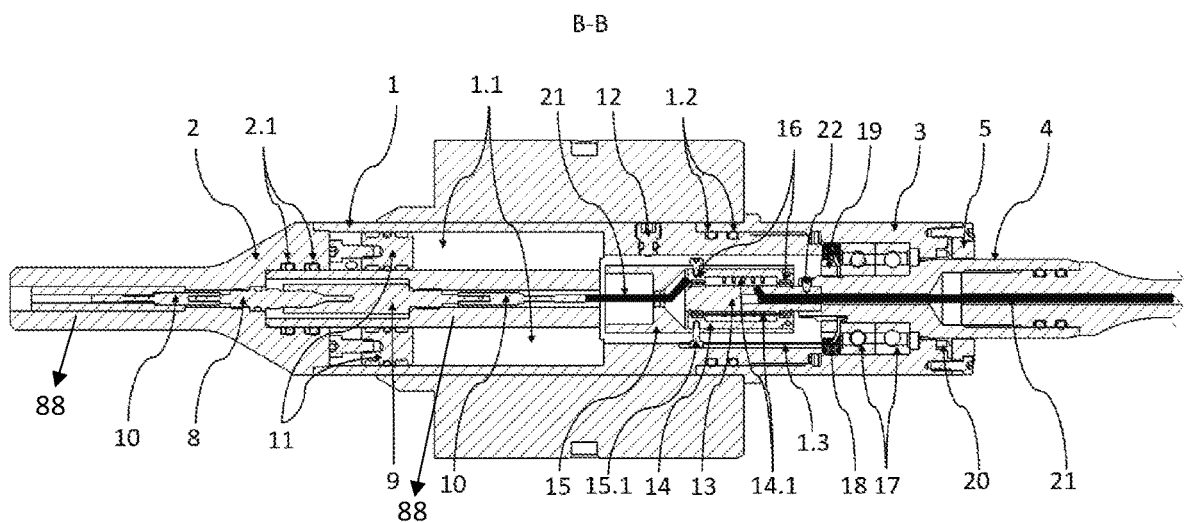
FIG. 3 is a sectional view B-B of the structure in FIG. 2.
Figure 4:
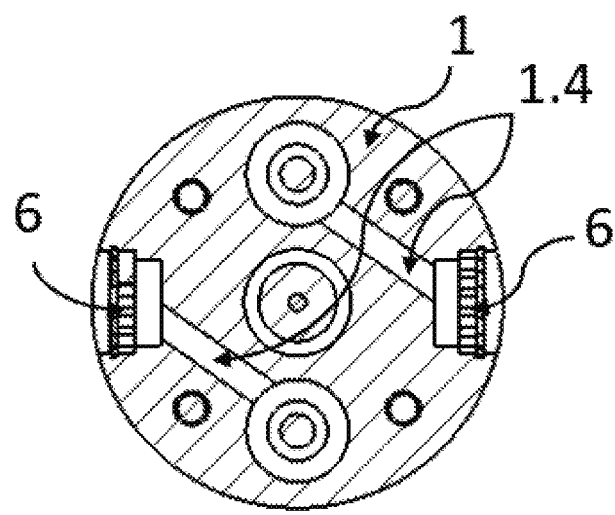
FIG. 4 is a longitudinal sectional view of the conductive slip ring for LWD instrument in the present disclosure.
Figure 5:
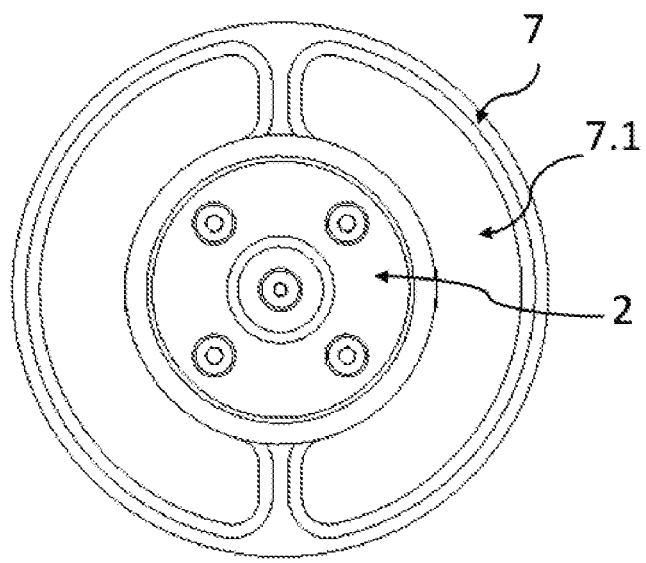
FIG. 5 is a left view of the conductive slip ring for logging while drilling (LWD) instrument in the present disclosure.

As shown in FIGS. 1-5, the present disclosure provides a conductive slip ring for logging while drilling (LWD) instrument. The conductive slip ring comprises a housing of slip ring device, a top connector of slip ring, a bottom connector of slip ring, an output shaft of slip ring, an end cap of slip ring, a support body, an inner core system of slip ring, and an electric power and signal transmission device;

wherein, the housing of slip ring device, the top connector of slip ring, the bottom connector of slip ring, the output shaft of slip ring, and the end cap of slip ring form a sealed cavity together, with high temperature-resistant lubricant fully filled in the sealed cavity, the top connector of slip ring is used as an electric power and signal input end or output end, the output shaft of slip ring is used as an electric power and signal input end or output end;

the electric power and signal transmission device is configured to transfer received electric power and signals to the inner core system of slip ring or transmit the electric power and signals emitted by the inner core system of slip ring;

the inner core system of slip ring is configured to transfer the received electric power and signals to the electric power and signal transmission device or transmit the electric power and signals emitted by the electric power and signal transmission device.

The support body is fixedly connected to a drill collar via a pin, a mud flow channel is arranged at the inner side of the support body, the housing of slip ring device is fixed inside the support body by screws, and the two ends of the housing of slip ring device extend out of the support body, the top connector of slip ring is arranged at one end of the housing of slip ring device, the bottom connector of slip ring is arranged at the other end of the housing of slip ring device, the end cap of slip ring is arranged at the other end of the bottom connector of slip ring, the electric power and signal transmission device is arranged inside the top connector of slip ring and extends into a cavity of slip ring inside the housing of slip ring device and is connected with one end of the inner core system of slip ring;

an output shaft support bearing is arranged inside the bottom connector of slip ring, an inner race of the output shaft support bearing is locked by means of a lock nut, a wavy spring is arranged at a joint between the housing of slip ring device and the bottom connector of slip ring, an outer race of the output shaft support bearing is pre-tensioned by compressing the wavy spring, one end of the output shaft of slip ring passes through the bottom connector of slip ring and is mounted on the output shaft support hearing, and is fixedly connected with one end of the inner core system of slip ring, and the other end of the output shaft of slip ring is connected with a relative rotation structure of the LAND instrument;

the housing of slip ring device is provided with a lubricant tiller that communicates with the cavity of slip ring and is provided with a lubricant plug.

The device further comprises a pressure balance system, which comprises at least one balance piston travel cylinder, a pressure balance piston, a filter screen, and a pressure balance hole;

wherein at least one of the balance piston travel cylinders is arranged inside the housing of slip ring device, the pressure balance piston is arranged inside the balance piston travel cylinder, the pressure balance hole is arranged in the housing of slip ring device, one end of the pressure balance hole communicates with the balance piston travel cylinder, the other end of the pressure balance hole communicates with the mud flow channel in the drill collar, and the filter screen is arranged on the end of the pressure balance hole that communicates with the mud flow channel in the drill collar.

The inner core system of slip ring comprises a rotor of slip ring, a stator of slip ring, a sheath, and a rotor support bearing;

wherein the rotor support bearing is fixedly arranged inside the sheath, the stator of slip ring is mounted on the rotor support bearing, the rotor of slip ring is arranged inside the stator of slip ring, and one end of the rotor of slip ring is connected via a pin with the output shaft of slip ring; stator brushes are embedded inside the stator of slip ring, gold-plated copper rings are embedded in the surface of the rotor of slip ring, and the stator brushes always contact with the gold-plated copper rings.

A stop screw is arranged on the sheath, and the stop screw is connected with the stator of slip ring; when the stop screw is embedded in a stop key slot in an inner side wall of the cavity of slip ring, the sheath and the stator of slip ring are fixed and can't rotate with respect to the housing of slip ring device.

The electric power and signal transmission device 88 comprises a high pressure electrical feedthru connector pin 8, a high pressure electrical feedthru connector boot 9, and transition sheaths 10;

One end of the high pressure electrical feedthru connector pin is inserted in the high pressure electrical feedthru connector boot, and the transition sheaths are arranged on the two ends of the high pressure electrical feedthru connector pin and the high pressure electrical feedthru connector boot.

The sheath is made of a high temperature-resistant non-metal material, including PEEK or nylon, The conductive slip ring further comprises a dynamic seal ring that is arranged in an end slot of the bottom connector of slip ring and then is fixed by means of the end cap of slip ring, the smoothness of the surface of the end slot of the bottom connector of slip ring and the left end face of the end cap of slip ring in contact with the dynamic seal ring 20 is Ra≤0.8 μm, and the smoothness of the surfaces of the output shaft of slip ring in contact with the dynamic seal ring 20 is Ra≤0.2 μm; the working temperature of the dynamic seal ring is −100° C.~+260° C., and the pressure difference between inside and outside of the seal is up to 15 Mpa; the Rockwell hardness of the surface of the output shaft of slip ring in contact with the dynamic seal ring is HRC≥55.

The output shaft of slip ring is made of carbide alloy or coated with ceramics on its surface to improve the hardness.

The slip ring is not directional in the operating process, which is to say, the top connector of slip ring 2 may be used as the electric power and signal input end, and the output shaft of slip ring 4 may be used as the output end. Alternatively, the output shaft of slip ring 4 may be used as the electric power and signal input end, and the top connector of slip ring 2 may be used as the output end. The specific setting may be selected appropriately according to the specific structure of the slip ring.

The number of cores of the electric power and signal wires of the slip ring may be selected as required. That is to say, the electric power and signal wires may be single-core or multi-core ones, and may be altered simply by altering the number of pins of the high pressure electrical feedthru connector pin 8 and the high pressure electrical feedthru connector boot 9 accordingly and altering the quantity of the conductive rings on the rotor of slip ring 13 and the quantity of the stator brushes 14.1 on the stator of slip ring 14. It can be expanded conveniently, and the application scenarios are not limited by the number of cores of the electric power and signal wires.

Hereunder the technical scheme will be detailed in an example where the top connector of slip ring 2 is used as the electric power and signal input end, the output shaft of slip ring 4 is used as the output end, and the electric power and signal wires are single-core wires.

The conductive slip ring system comprises a housing of slip ring device 1, a top connector of slip ring 2, a bottom connector of slip ring 3, an output shaft of slip ring 4, an end cap of slip ring 5, and a support body 7. The output shaft of slip ring 4 is rotatable with respect to the other parts. The housing of slip ring device 1, the top connector of slip ring 2, the bottom connector of slip ring 3, the output shaft of slip ring 4, the end cap of slip ring 5, and a dynamic seal ring 20 form a sealed cavity together, with high temperature-resistant lubricant fully filled in the sealed cavity.

The support body 7 is fixedly connected with the housing of slip ring device 1 by screws, and is fixedly connected with a drill collar via a pin, so that the slip ring body is supported inside the drill collar of the instrument. The outer diameter of the support body 7 may be changed according to the size of the through-hole in the drill collar of the specific instrument. Mud can flow through the slip ring body through a mud flow channel 7.1.

The top connector of slip ring 2 is connected with the housing of slip ring device 1 through a flange connection or threaded connection, and the joint is absolutely sealed by means of an O-ring 2.1 to prevent intrusion of the mud or leakage of the lubricant.

The housing of slip ring device 1 is connected with the bottom connector of slip ring 3 through a threaded connection, and the joint is absolutely sealed by means of an O-ring 1.2 to prevent intrusion of the mud or leakage of the lubricant. The bottom connector of slip ring 3 is connected with the housing of slip ring device 1 through a flange connection or threaded connection.

The electric power and signal wired are soldered to the left end of a transition sheath 10 of the top connector of slip ring 2, connected to a transition sheath 10 of the housing of slip ring device 1 via a high pressure electrical feedthru connector pin 8 and a high pressure electrical feedthru connector boot 9, and then connected to the stator of slip ring 14 through conductive wires 21.

A rotor of slip ring 13, a stator of slip ring 14, a sheath 15, and a rotor support bearing 16 form an inner core system of slip ring, the sheath 15 is made of a high temperature-resistant non-metal material such as PEEK or nylon, etc., and is mainly used to provide an insulation protection function for the rotor of slip ring 13 and the stator of slip ring 14. Stator brushes 14.1 are embedded in the stator of slip ring 14, the stator brushes 14.1 are a set of gold-plated elastic steel plates, and the quantity of the stator brushes 14.1 may be determined according to the number of cores of the electric power and signal wires of the slip ring. Gold-plated copper rings are embedded in the surface of the rotor of slip ring 13 and always contact with the stator brushes 14.1, and the quantity of the copper rings corresponds to the quantity of the elastic steel plates of the stator brushes 14.1. The rotor support hearing 16 is composed of an upper bearing and a lower bearing, and is configured to support the rotor of slip ring 13, so that the rotor of slip ring 13 and the stator of slip ring 14 can rotate with respect to each other.

The sheath 15 is connected with the stator of slip ring 14 via a stop screw 15.1, which is embedded in a stop key slot 1.3, so that the sheath 15 and the stator of slip ring 14 are fixed and can't rotate with respect to the housing of slip ring device 1.

The rotor of slip ring 13 is connected with the output shaft of slip ring 4 via a pin 22, and the output shaft of slip ring 4 is connected with a relative rotation structure of the LWD instrument.

An output shaft support bearing 17 supports the output shaft of slip ring 4, so that the output shaft of slip ring 4 can rotate with respect to the slip ring body. The output shaft support bearing 17 may be selected according to the specific operating condition; for example, a thrust bearing may be selected if the output shaft of slip ring 4 bears axial force; an angular contact ball bearing or taper roller bearing may be selected if the output shaft of slip ring 4 bears lateral force or bending moment; the quantity of the bearings may be increased or decreased according to the load; different bearings may be used in combination to attain an ideal supporting effect if the output shaft bear of slip ring is subjected to a combined load of axial force, lateral force, and bending moment.

The inner race of the output shaft support bearing 17 is locked by means of a lock nut 19. A wavy spring 18 is compressed when the bottom connector of slip ring 3 is mounted to the housing of slip ring device 1 via threads, and thereby the outer race of the output shaft support bearing 17 is pre-tensioned.

The dynamic seal ring 20 is a tailor-made seal ring, its working temperature is −100° C.~+260° C., and the pressure difference between inside and outside of the seal is up to 15 Mpa. The dynamic seal ring 20 is arranged in an end slot of the bottom connector of slip ring 3 and then is fixed by means of the end cap of slip ring 5, the smoothness of the surface of the end slot of the bottom connector of slip ring 3 and the left end face of the end cap of slip ring 5 in contact with the dynamic seal ring 20 is Ra≤0.8 μm, the smoothness of the surface of the output shaft of slip ring 4 in contact with the dynamic seal ring 20 is Ra≤0.2 μm, and the Rockwell Hardness of the surface of the output shaft of slip ring 4 in contact with the dynamic seal ring 20 is HRC≥55. The output shaft of slip ring 4 is usually made of carbide alloy or coated with ceramics to improve the hardness and thereby improve the service life of the dynamic seal.

After the lubricant plug 12 is removed, a lubricant is filled into the entire cavity of slip ring and the balance piston travel cylinder by means of an external lubricant filling machine, and vacuum pumping and circulation is maintained in the lubricant filling process to expel any air in the lubricant as far as possible. The two pressure balance pistons 11 are always kept at the left end of the slip ring in the lubricant filling process, so that the lubricant is filled as much as possible into the entire cavity of slip ring.

The two balance piston travel cylinders 1.1 communicate with the mud via the two lateral pressure balance holes 1.4 to balance the pressure difference between the external mud and the internal lubricant, so that the dynamic seal can work normally and reliably.

The mud is filtered through the two filter screens 6, to prevent the balance holes from blocked by over-sized particles in the mud and thereby prevent adverse effect to the normal operation of the balance pistons.

The two pressure balance pistons 11 complement each other. Thus, if one of the pressure balance pistons 11 fails in the harsh downhole operating environment, the other pressure balance piston 11 still can operate normally, and thereby ensures normal operation of the slip ring.

As the drilling depth is increased in the drilling process, the external mud pressure is increased continuously, the pressure balance piston 11 moves inside the balance piston travel cylinder 1.1 and thereby balances the pressure difference between the external mud and the internal lubricant.

The internal lubricant pressure is decreased to some degree owing to the fact that the dynamic seal ring 20 has some lubricant leakage in the rotation process. The pressure balance piston 11 moves inside the balance piston travel cylinder 1.1 to replenish oil and balance off the pressure difference.

The working principle of the present disclosure is as follows: the housing of slip ring device, the top connector of slip ring, the bottom connector of slip ring, the output shaft of slip ring, and the end cap of slip ring form a sealed cavity together, the sealed cavity is fully filled with a high temperature-resistant lubricant, and the pressure is balanced with the environment by means of the balance piston structure, so that the slip ring can work normally at high temperature and high pressure. The top connector of slip ring and the output shaft of slip ring may be used as an electric power and signal input end and an output end respectively, and the arrangement is not directional. For instance, in the case that the top connector of slip ring is used as the electric power and signal input end, the electric power and signal transmission device transfers received electric power and signals to the inner core system of slip ring, which mainly comprises a rotor of slip ring and a stator of slip ring, etc., stator brushes are embedded in the stator of slip ring, gold-plated copper rings are embedded in the surface of the rotor of slip ring, the stator brush always contacts with the gold-plated copper ring, and the stator and the rotor can rotate with respect to each other, so that the electric power and signals are transferred to the output shaft of slip ring, and thereby the transmission of the electric power and signals between two structures with relative rotation is realized.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed:

1. A conductive slip ring for logging while drilling (LWD) instrument, comprising:
a housing of a conductive slip ring device;

a top connector of the conductive slip ring;
a bottom connector of the conductive slip ring;
an output shaft of the conductive slip ring;
an end cap of the conductive slip ring;
a support body;
an inner core system of the conductive slip ring, and
an electric power and signal transmission device, wherein
the housing of the conductive slip ring device, the top connector of the conductive slip ring; the bottom connector of the conductive slip ring, the output shaft of the conductive slip ring; and the end cap of the conductive slip ring form a sealed cavity, with high temperature-resistant lubricant fully filled in the sealed cavity;
the top connector of the conductive slip ring is used as an electric power and signal input end or output end;
the output shaft of the conductive slip ring is used as an electric power and signal input end or output end;
an electric power and signal transmission device is configured to transfer received electric power and signals to the inner core system of the conductive slip ring or transmit the electric power and signals emitted by the inner core system of conductive slip ring;
the electric power and signal transmission device is arranged inside the top connector of conductive slip ring;
the inner core system of the conductive slip ring is configured to transfer received electric power and signals to the electric power and signal transmission device or transmit the electric power and signals emitted by the electric power and signal transmission device; and
the inner core system of the conductive slip ring is arranged inside the housing of the conductive slip ring device,
wherein
the support body is fixedly connected to a drill collar via a pin;
a mud flow channel is arranged at the inner side of the support body;
the housing of conductive slip ring device is fixed inside the support body through screws;
the two ends of the housing of conductive slip ring device extend out of the support body;
the top connector of the conductive slip ring is arranged at one end of the housing of the conductive slip ring device;
the bottom connector of the conductive slip ring is arranged at the other end of the housing of the conductive slip ring device;
the end cap of the conductive slip ring is arranged at the other end of the bottom connector of the conductive slip ring;
the electric power and signal transmission device is arranged inside the top connector of the conductive slip ring and extends into a cavity of the conductive slip ring inside the housing of the conductive slip ring device and is connected with one end of the inner core system of the conductive slip ring;
an output shaft support bearing is arranged inside the bottom connector of the conductive slip ring;
an inner race of the output shaft support bearing is locked through a lock nut;
a wavy spring is arranged at a position where the housing of the conductive slip ring device is connected with the bottom connector of the conductive slip ring;

an outer race of the output shaft support bearing is pre-tensioned by compressing the wavy spring;
one end of the output shaft of the conductive slip ring passes through the bottom connector of the conductive slip ring and is mounted on the output shaft support bearing; and is fixedly connected with one end of the inner core system of the conductive slip ring;
the other end of the output shaft of the conductive slip ring is connected with a relative rotation structure of the LWD instrument; and
the housing of the conductive slip ring device is provided with a lubricant filler that communicates with the cavity of the conductive slip ring and is provided with a lubricant plug.

2. The conductive slip ring according to claim 1, further comprising a pressure balance system, which comprises at least one balance piston travel cylinder, a pressure balance piston, a filter screen, and a pressure balance hole, wherein
at least one of the balance piston travel cylinders is arranged inside the housing of the conductive slip ring device at the other end of the cavity of the conductive slip ring and communicates with the housing of the conductive slip ring device;
the pressure balance piston is arranged inside the balance piston travel cylinder, the pressure balance hole is arranged on the housing of the conductive slip ring device;
one end of the pressure balance hole communicates with the balance piston travel cylinder;
the other end of the pressure balance hole communicates with the mud flow channel in the drill collar; and
the filter screen is arranged on the end of the pressure balance hole that communicates with the mud flow channel in the drill collar.

3. A conductive slip ring for logging while drilling (LWD) instrument, comprising:
a housing of a conductive slip ring device;
a top connector of the conductive slip ring;
a bottom connector of the conductive slip ring;
an output shaft of the conductive slip ring;
an end cap of the conductive slip ring;
a support body;
an inner core system of the conductive slip ring, and
an electric power and signal transmission device, wherein
the housing of the conductive slip ring device, the top connector of the conductive slip ring; the bottom connector of the conductive slip ring, the output shaft of the conductive slip ring; and the end cap of the conductive slip ring form a sealed cavity, with high temperature-resistant lubricant fully filled in the sealed cavity;
the top connector of the conductive slip ring is used as an electric power and signal input end or output end;
the output shaft of the conductive slip ring is used as an electric power and signal input end or output end;
an electric power and signal transmission device is configured to transfer received electric power and signals to the inner core system of the conductive slip ring or transmit the electric power and signals emitted by the inner core system of conductive slip ring;
the electric power and signal transmission device is arranged inside the top connector of conductive slip ring;
the inner core system of the conductive slip ring is configured to transfer received electric power and signals to the electric power and signal transmission device or transmit the electric power and signals emitted by the electric power and signal transmission device; and the inner core system of the conductive slip ring is arranged inside the housing of the conductive slip ring device, wherein the inner core system of the conductive slip ring comprises a rotor of the conductive slip ring, a stator of the conductive slip ring, a sheath, a rotor support bearing, and a stop screw, wherein the rotor support bearing is fixedly arranged inside the sheath;

the stator of the conductive slip ring is mounted on the rotor support bearing;

the sheath is connected via the stop screw with the stator of the conductive slip ring;

the rotor of the conductive slip ring is arranged inside the stator of the conductive slip ring;

one end of the rotor of the conductive slip ring is connected via a pin with the output shaft of the conductive slip ring;

stator brushes are embedded inside the stator of the conductive slip ring;

gold-plated copper rings are embedded on the surface of the rotor of the conductive slip ring;

the stator brushes always contact with the gold-plated copper rings; and when the stop screw is embedded in a stop key slot in an inner side wall of the cavity of the conductive slip ring, the sheath and the stator of the conductive slip ring are fixed and can't rotate with respect to the housing of the conductive slip ring device.

4. A conductive slip ring for logging while drilling (LWD) instrument, comprising:
a housing of a conductive slip ring device;
a top connector of the conductive slip ring;
a bottom connector of the conductive slip ring;
an output shaft of the conductive slip ring;
an end cap of the conductive slip ring;
a support body;
an inner core system of the conductive slip ring, and
an electric power and signal transmission device, wherein
the housing of the conductive slip ring device, the top connector of the conductive slip ring; the bottom connector of the conductive slip ring, the output shaft of the conductive slip ring; and the end cap of the conductive slip ring form a sealed cavity, with high temperature-resistant lubricant fully filled in the sealed cavity;

the top connector of the conductive slip ring is used as an electric power and signal input end or output end;

the output shaft of the conductive slip ring is used as an electric power and signal input end or output end;

an electric power and signal transmission device is configured to transfer received electric power and signals to the inner core system of the conductive slip ring or transmit the electric power and signals emitted by the inner core system of conductive slip ring;

the electric power and signal transmission device is arranged inside the top connector of conductive slip ring;

the inner core system of the conductive slip ring is configured to transfer received electric power and signals to the electric power and signal transmission device or transmit the electric power and signals emitted by the electric power and signal transmission device; and the inner core system of the conductive slip ring is arranged inside the housing of the conductive slip ring device, wherein the electric power and signal transmission device comprises a high pressure electrical feedthru connector pin, a high pressure electrical feedthru connector boot, and transition sheaths;

one end of the high pressure electrical feedthru connector pin is inserted in the high pressure electrical feedthru connector boot;

the transition sheaths are arranged at the two ends of the high pressure electrical feedthru connector pin and the high pressure electrical feedthru connector boot; and the high pressure electrical feedthru connector pin and the high pressure electrical feedthru connector boot has one or more pins.

5. The conductive slip ring according to claim 3, wherein the sheath is made of a high temperature-resistant non-metal material, including PEEK or nylon.

6. The conductive slip ring according to claim 1, further comprising a dynamic seal ring that is arranged in an end slot of the bottom connector of the conductive slip ring and then fixed by the end cap of the conductive slip ring; the smoothness of the surface of the end slot of the bottom connector of the conductive slip ring and the left end face of the end cap of the conductive slip ring in contact with the dynamic seal ring is Ra≤0.8 µm, and the smoothness of the surface of the output shaft of the conductive slip ring in contact with the dynamic seal ring is Ra≤0.2 µm.

7. The conductive slip ring according to claim 6, wherein the working temperature of the dynamic seal ring is −100° C.~+260° C., and the pressure difference between inside and outside of the seal is up to 15 Mpa; the Rockwell hardness of the surface of the output shaft of the conductive slip ring in contact with the dynamic seal ring is HRC≥55.

8. The conductive slip ring according to claim 1, wherein the output shaft of the conductive slip ring is made of carbide alloy or coated with ceramics on its surface to improve the hardness.

9. The conductive slip ring according to claim 3, wherein the stator brushes are a set of gold-plated elastic steel plates; the quantity of the stator brushes corresponds to the number of cores of the conductive wire; the stator brushes and the gold-plated copper rings are in one-to-one correspondence to each other.

10. The conductive slip ring according to claim 2, further comprising a dynamic seal ring that is arranged in an end slot of the bottom connector of the conductive slip ring and then fixed by the end cap of the conductive slip ring; the smoothness of the surface of the end slot of the bottom connector of the conductive slip ring and the left end face of the end cap of the conductive slip ring in contact with the dynamic seal ring is Ra≤0.8 µm, and the smoothness of the surface of the output shaft of the conductive slip ring in contact with the dynamic seal ring is Ra≤0.2 µm.

* * * * *